United States Patent [19]

Moren et al.

[11] Patent Number: 5,346,939

[45] Date of Patent: Sep. 13, 1994

[54] WATER CURABLE RESIN COMPOSITIONS

[75] Inventors: Dean M. Moren, North St. Paul; Dean A. Ersfeld, Maplewood, both of Minn.

[73] Assignee: Minnesota Mining and Manufacturing Company, St. Paul, Minn.

[21] Appl. No.: 8,743

[22] Filed: Jan. 25, 1993

[51] Int. Cl.$^5$ .................. C08J 3/215; C08J 3/21; C08L 23/02

[52] U.S. Cl. .................. 524/176; 524/174; 524/183; 524/184; 524/185; 524/186; 524/261; 524/262; 524/398; 524/399; 524/405; 524/437

[58] Field of Search .............. 524/176, 183, 261, 398

[56] References Cited

U.S. PATENT DOCUMENTS

| | | | |
|---|---|---|---|
| 2,809,184 | 10/1957 | Langer | 428/379 |
| 2,946,756 | 7/1960 | Wheelock et al. | 528/391 |
| 3,027,336 | 3/1962 | Gotz et al. | 521/117 |
| 3,216,964 | 11/1965 | Brubaker et al. | 524/297 |
| 3,324,075 | 6/1967 | Burak | 524/261 |
| 3,475,371 | 10/1969 | Stewart et al. | 524/261 |
| 3,630,917 | 12/1971 | McCord | 252/78.3 |
| 3,694,399 | 9/1972 | Schwarz | 524/261 |
| 3,780,132 | 12/1973 | Lohr | 523/427 |
| 4,143,013 | 3/1979 | Jenkinson | 522/77 |
| 4,283,387 | 8/1981 | Young et al. | 424/78 |
| 4,335,158 | 6/1982 | Beede et al. | 427/2 |
| 4,411,262 | 10/1983 | von Bonin | 128/90 |
| 4,473,671 | 9/1984 | Green | 532/105 |
| 4,480,072 | 10/1984 | Mallon | 525/61 |
| 4,502,479 | 3/1985 | Garwood | 128/90 |
| 4,570,622 | 2/1986 | von Bonin et al. | 128/90 |
| 4,584,280 | 4/1986 | Nanao et al. | 501/80 |
| 4,593,068 | 6/1986 | Hirose et al. | 525/100 |
| 4,609,578 | 9/1986 | Reed | 428/76 |
| 4,628,076 | 12/1986 | Chang et al. | 525/440 |
| 4,667,661 | 5/1987 | Scholz et al. | 602/8 |
| 4,672,956 | 6/1987 | Potter et al. | 602/8 |
| 4,774,937 | 10/1988 | Scholz et al. | 602/8 |
| 4,788,164 | 11/1988 | Che et al. | 501/39 |
| 4,814,368 | 3/1989 | Stein et al. | 524/158 |
| 4,841,958 | 6/1989 | Ersfeld et al. | 128/90 |
| 4,856,502 | 8/1989 | Ersfeld et al. | 128/90 |
| 4,879,065 | 11/1989 | Sterzel | 252/600 |
| 4,882,377 | 11/1989 | Sweet et al. | 524/267 |
| 4,910,255 | 3/1990 | Wakabayashi et al. | 525/100 |
| 4,951,656 | 8/1990 | Gorka et al. | 128/90 |
| 4,977,228 | 12/1990 | Wakabayashi et al. | 528/12 |
| 4,983,369 | 1/1991 | Barder | 423/338 |
| 5,005,566 | 4/1991 | Klintworth, Jr. | 128/90 |
| 5,041,287 | 8/1991 | Driggers et al. | 424/81 |
| 5,052,380 | 10/1991 | Polta | 128/90 |
| 5,135,894 | 8/1992 | Kendall | 501/94 |
| 5,158,758 | 10/1992 | Chieng | 423/338 |

FOREIGN PATENT DOCUMENTS 486020 5/1992 European Pat. Off. .
926037 5/1963 United Kingdom .

OTHER PUBLICATIONS

C. Sun et al., *Journal of Polymer Science, Part B: Polymer Physics*, vol. 25, 1561–1564 (1987).

*Primary Examiner*—Fred Zitomer
*Attorney, Agent, or Firm*—Gary L. Griswold; Walter N. Kirn; F. Andrew Ubel

[57] ABSTRACT

The present invention provides a water-curable resin composition for use in the preparation of composite materials. The resin composition is composed of a water-reactive liquid organometallic compound having a viscosity of no greater than about 500,000 centipoise under ambient conditions; and a nonreactive organic thermoplastic polymer, having a number average molecular weight of at least about 1,000, mixed with the water-reactive liquid organometallic compound. Preferably, the water-reactive liquid organometallic compound is a compound of the formula $(R^1O)_xMR^2_{(y-x)}$ wherein: each $R^1$ is independently a substituted or unsubstituted $C_1$-$C_{100}$ hydrocarbon group, optionally interrupted in the backbone by 1—10 nonperoxide —O—, —S—, —C(O)—, or —N— groups; each $R^2$ is independently selected from the group consisting of hydrogen and a substituted or unsubstituted $C_1$-$C_{100}$ hydrocarbon group, optionally interrupted in the backbone by 1—10 nonperoxide —O—, —S—, —C(O)—, or —N— groups; x is an integer between 1 and y, inclusive; y is the valence of M; and M is boron, aluminum, silicon, or titanium.

25 Claims, 1 Drawing Sheet

WATER CURABLE RESIN COMPOSITIONS

FIELD OF THE INVENTION

The present invention is directed to water-curable composite materials, generally useful as sandable patching, filling, and surface coating materials. The invention also relates to methods of making the composite materials, methods of using the composite materials, and the resulting products.

BACKGROUND OF THE INVENTION

Composite materials are generally defined as materials containing a mixture of two or more constituents that are solid in the finished product, mutually insoluble, and differ in chemical nature. Such composite materials are highly attractive for many applications, typically because they possess unique characteristics relating to rigidity, toughness, strength, density, and particularly cost. Most composite materials are macroscopic combinations of an inorganic reinforcing material and an organic polymeric matrix material. The organic polymeric matrix material is generally either obtained from a thermoplastic or thermoset resin.

Composite materials are generally utilized in a prepreg form, i.e., a form in which the reinforcing material is combined with the resin before molding. That is, the inorganic reinforcing material and an amorphous, reactive, organic matrix material are combined prior to use as a composite. Typically, in a prepreg the organic matrix material is an amorphous thermoplastic material. The transformation of the amorphous thermoplastic material (i.e., a polymer that softens when heated and hardens when cooled) into a thermoset material (i.e., a polymer that becomes crosslinked when cured) can be initiated by an energy input into the system or by introduction of a catalyst or coreactant. An example of such a catalyst or coreactant is water.

The inorganic reinforcing material used in composites can be obtained from an organometallic compound when contacted with water. Many organometallic compounds, such as metal alkoxides, are known to undergo hydrolysis on contact with water to form the corresponding metal hydroxides. Metal hydroxides often undergo subsequent condensation reactions to form compounds having M-O-M bonds (M=metal). In this way, organometallic compounds can decompose to form an essentially inorganic reinforcing material.

In certain mixtures of organometallic compounds and organic polymers, the two components react to provide polymer-bound organometallic compositions. In such situations, there is little or no free organometallic compound to act as solvent for the organic polymer. Therefore, the viscosity of the derived composition would be very similar to that of the organic polymer itself. Such composite materials are of limited value because their viscosities cannot be readily controlled. Thus, they are not useful for a wide variety of for various applications.

In other mixtures of organometallic compounds and organic polymers, the organometallic compound is used simply as a filler or as a polymer swelling agent. In some situations, the organometallic compound acts as a plasticizer to increase the ductility, reduce the glass transition temperature, and reduce the brittleness of the polymer. In such applications, an organometallic compound is used in an amount of only up to about 25% by weight of the host polymer. These compositions are not suitable composite materials because they are generally not flowable and do not possess acceptable coating viscosities.

Some combinations of organic polymers and organometallic compounds also include a volatile organic solvent. Such mixtures are undesirable because of the need to evaporate the organic solvent from the composite material. The evaporation of an organic solvent in the preparation of a composite material is undesirable because of the potential environmental impact of the organic solvent, the associated increased energy requirement, and the limitation such a step places on the production rate of the composite material.

U.S. Pat. No. 4,879,065 discloses an organic solvent-free, high temperature mixture of an organic polymer with an organometallic compound. Solutions of organometallic compounds with organic polymers at temperatures in excess of 170° C. are exemplified, but the existence and stability of these solutions at ambient temperature are not shown. Furthermore, because of the high processing temperatures required, the number of useful polymers is quite small, being limited to those that are heat stable.

Other organic solvent-free mixtures of an organic polymer with an organometallic compound incorporate reactive groups such as acrylates, isocyanates, and epoxides. In order to produce useful composite materials, such reactive groups are necessarily present in the organic species. Because of this, there is the potential that such reactive groups could contact the user of the derived product. Because of any perceived health hazards associated with such reactive groups, it is desirable to manufacture products that are essentially free of these highly reactive moieties.

Silicone polymers, such as polydialkylsiloxane polymers, have also been used with organometallic compounds. Such combinations are used in the preparation of silicone rubber having good high temperature properties. These silicone rubbers are not widely applicable composite materials, however, because they do not generally overcoat well, e.g., few paint formulations adhere well to them.

Therefore, a need exists for a resin composition that is stable under ambient conditions, is flowable, and is free of highly reactive, potentially harmful, moieties. Also, a need exists for a resin composition that cures with water under ambient conditions. Furthermore, a need exists for such a composition that is capable of possessing a wide variety of viscosities.

RELATED APPLICATIONS

Of related interest are the following U.S. Patent Applications, filed on Jan. 25, 1993 by the assignee of this invention: Microfiber Fillers for Orthopedic Casting Tapes—Serial No. 08/008755; Microcreping of Fabrics for Orthopedic Casting Tapes—Serial No. 08/008751; Mechanically Compacted Fabrics for Orthopedic Casting Tapes—Serial No. 08/008161; Orthopedic Support Materials and Method—Serial No. 08/008678; and Fabric for Orthopedic Support Materials—Serial No. 08/009925 which are herein incorporated by reference.

SUMMARY OF THE INVENTION

The present invention provides a water-curable multicomponent resin composition capable of curing to form a composite material. The resin composition contains a mixture, preferably a solution, of a water-reactive liquid organometallic compound and a nonreactive organic thermoplastic polymer. These resin compositions, e.g., polymer solutions, are stable under a wide range of conditions, such as temperatures of about 0°–100° C. That is, the organic polymer and the liquid organometallic compound do not phase separate, i.e., they do not separate out of a uniformly dispersed mixture, into generally separate and individual phases, nor do they react substantially with each other or with themselves during storage at a temperature of about 0°–100° C. Furthermore, when kept from moisture, the compositions remain flowable, flexible, pliable, and capable of adhering to the desired substrate. The invention is also directed to a method for transforming the water-curable multicomponent resin compositions into composite materials and to the products produced therefrom.

The liquid organometallic compound is present in an amount of about 1–99 wt-%, preferably 30–99 wt-%, based on the total weight of the resin composition. Although the organic polymer may be dispersible in the liquid organometallic compound, it is preferably soluble in the organometallic compound. Thus, the organometallic compound preferably acts as a solvent to dissolve the organic thermoplastic polymer. As a result of this interaction (i.e., dispersion or solution), a wider variety of organic thermoplastic polymers can be used in composite materials than has been previously possible. Generally, suitable organic thermoplastic polymers have a number average molecular weight of at least about 1,000.

The water-reactive liquid organometallic compound contains at least one hydrolyzable group, i.e., water-reactive group, per molecule and preferably at least three hydrolyzable groups for certain applications.

The hydrolyzable groups include halogen atoms, alkoxy groups, alkenoxy groups, carboxy groups, amino groups, amide groups, dialkylaminooxy groups, ketoxime groups, aldoxime groups, and the like. Preferably, the hydrolyzable groups are selected from the group consisting of alkoxy, alkenoxy, carboxy, amino, amide, dialkylaminooxy, ketoxime, and aldoxime. More preferably, the hydrolyzable groups are alkoxy groups, such as methoxy and ethoxy. Thus, the organometallic compounds used in the resin compositions of the present invention undergo hydrolysis on contact with water to form the corresponding metal hydroxides. These metal hydroxides can then undergo subsequent condensation reactions to form an inorganic reinforcing material having M—O—M bonds (M=metal), although this is not necessarily a requirement of the organometallic compound in order to form a useable composite material.

Preferably, the water-reactive liquid organometallic compound has a viscosity of no greater than about 10,000 centipoise under ambient conditions. The resultant water-curable multicomponent resin composition has a viscosity of about 100–500,000 centipoise under ambient conditions, i.e., at a temperature of about 20–30° C. and atmospheric pressure (about 1 atm). As used herein, "water-curable" means that the multicomponent resin composition is capable of hardening to a rigid, semirigid, or flexible composite structure on exposure to water such that the resin composition is no longer fluid, i.e., flowable. Although water cure can occur under a variety of conditions of temperature and pressure, it advantageously occurs under ambient conditions As used herein, "resin composition" refers to a mixture, i.e., uniform dispersion, formed from a combination of a water-reactive organometallic liquid and a nonreactive organic polymer. Preferably, the resin composition is a polymer solution, wherein the organometallic liquid acts as a solvent.

Preferably, the water-reactive liquid organometallic compound having at least one hydrolyzable group, and preferably three hydrolyzable groups, per molecule, is a compound of the formula $(R^1O)_xMR^2_{(y-x)}$ (Formula I) wherein: each $R^1$ is independently a substituted or unsubstituted $C_1$–$C_{100}$ hydrocarbon group, optionally interrupted in the backbone by 1—50 nonperoxide —O—, —C(O)—, —S—, or —N—groups; each $R^2$ is independently selected from the group consisting of hydrogen and a substituted or unsubstituted $C_1$–$C_{100}$ hydrocarbon group, optionally interrupted in the backbone by 1—50 nonperoxide —O—, —C(O)—, —S—, or —N— groups; x is an integer between 1 and y, inclusive; y is the valence of M; and M is selected from the group consisting of boron, aluminum, silicon, and titanium. Preferably, x=y, and more preferably x=3.

The resin compositions, e.g., polymer solutions, of the present invention contain a nonreactive organic thermoplastic polymer. This includes silane functional organic polymers, i.e., polymers having alkoxy silane functionality. As used herein, the term "silane functional organic polymer" refers to a carbon-based polymer containing covalently bonded hydrolyzable silane group(s), i.e., alkoxy silane groups of the formula -SiOR wherein R represents a hydrocarbon, preferably an alkyl group. As used herein, the term "nonreactive" organic polymer is used to refer to those organic polymers that do not incorporate "reactive" groups, such as acrylates, isocyanates, epoxides, aziridines, and the like, that are reactive toward biomatter. With such "reactive" groups, the organic polymer would be capable of reacting with itself, with the organometallic liquid, or with animal tissue, during cure. Organic polymers containing hydrolyzable silane functional groups are not classified herein as "reactive" because the reactions they undergo result in a relatively low health hazard. It is understood, however, that although classified herein as "nonreactive" such organic polymers are capable of reacting with the organometallic compounds. Thus, for certain applications it may be desirable to include such groups and in other applications it may be desirable to avoid the inclusion of silicon-containing functional groups in the organic polymer.

The water-reactive organometallic liquid is preferably used to dissolve nonreactive, including silane functional, organic polymers in the absence of additional organic solvents. On activation with water, these compositions produce rigid materials having organic polymeric phases and solid inorganic phases derived from the organometallic liquid. The ability of organometallic liquids to act as solvents at a temperature of about 0°–100° C. for nonreactive organic polymers in the absence of additional organic solvent provides a means for producing a wide variety of composite materials with unique properties.

In addition to a liquid organometallic compound and a nonreactive organic thermoplastic polymer, the resin compositions of the present invention can also include a catalyst, surfactant, toughening agent, filler, and colorant. The multicomponent resin compositions of the present invention are toxicologically and environmentally compatible. This is because no highly reactive chemical substituents are used, no additional organic solvent is necessary, and the dissolved organic species are polymeric. Furthermore, the resin compositions are easily handled at ambient temperatures because of the relatively low solution viscosities possible. As a result, no specialized pumps or extruders are generally required.

In the context of the present invention with respect to Formula I, the term "hydrocarbon" means an aromatic, heterocyclic, saturated or unsaturated linear, branched, or cyclic substituent. This term is used to encompass alkyl and vinyl groups, for example. Also included within the meaning of the term "hydrocarbon" as used herein are acyl groups and poly(alkylene oxide) groups. The term "heterocyclic" means a mono- or polynuclear saturated or unsaturated cyclic group containing carbons and one or more heteroatoms such as nitrogen, oxygen, phosphorus, silicon, or sulfur or a combination thereof in the ring or rings. The term "alkyl" means a monovalent residue remaining after removal of a hydrogen atom from a linear or branched chain hydrocarbon. The term "cycloalkyl" means a monovalent residue remaining after removal of a hydrogen atom from a saturated cyclic hydrocarbon. The term "aromatic" or "aryl" means a monovalent residue remaining after removal of a hydrogen atom from an aromatic compound (single ring and multi- or fused-ring) including substituted aromatics such as lower alkaryl and aralkyl groups, lower alkoxy, N,N-di(lower alkyl)amino, nitro, cyano, halo, and lower alkyl carboxylic acid ester, wherein "lower" means a group having 1-4 carbon atoms. The term "acyl" means a monovalent organic acid residue remaining after removal of the OH of the carboxyl group from an alkyl or aryl carboxylic acid. The term "alkenyl" means a monovalent residue remaining after removal of a hydrogen atom from a linear or branched chain hydrocarbon containing at least one carbon-carbon double bond.

DETAILED DESCRIPTION OF THE INVENTION

Figure 1:
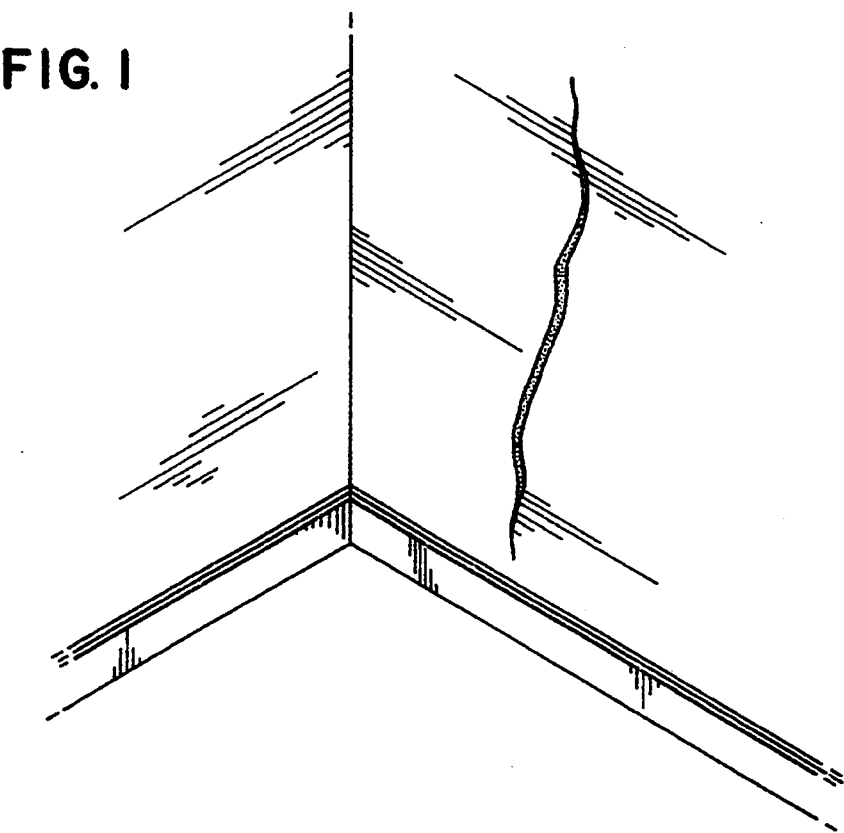
FIG. 1 is a schematic representation of the composite material of the present invention shown as a putty filler in position in a crack.

The present invention provides new resin compositions, preferably in the form of polymer solutions, that cure to form composite materials. These resin compositions are stable under a wide variety of conditions, such as temperatures of about 0-100° C., and particularly under ambient conditions, i.e., 20-30° C. and atmospheric pressure. As used herein, "stable" means that the components do not phase separate or react during storage and prior to cure.

The resin compositions of the present invention can be cured upon exposure to water under a variety of conditions of temperature and pressure. For example, they can cure at a temperature of about 10-100° C., and preferably about 10°-80° C. Advantageously, however, extreme temperatures are not required. That is, the resin compositions of the present invention advantageously can cure upon exposure to water under ambient conditions, i.e., about 20-30° C. and about 1 atmosphere.

Additionally and preferably, suitable resin compositions for use in preparing the composite materials of the present invention have the following properties: (1) substantial storage life; (2) appropriate viscosity and flow characteristics such that they are easily applied yet remain in place during cure; (3) water-curable, i.e., curable upon exposure to moisture in the air, upon mixing with water, or through some similar action; (4) controllable cure rate with a reasonable work life such that there is a reasonable period of time in which to mold the material; (5) cure to a rigid, semirigid, or flexible crosslinked composite material; (6) cure without the generation of substantial heat; (7) cure without undesirable amounts of bloom from various additives included therein; (8) minimal or nonoffensive smell; and (9) free of offensive or noxious organic solvents. The present invention concerns the development and identification of such a resin composition, characterized by the avoidance therein of reactive functionalities such as acrylates, isocyanates, epoxides, and aziridines.

Curable resin compositions for use in preparing the composite materials of the present invention are composed of: (a) a water-reactive liquid organometallic compound; and (b) a nonreactive thermoplastic organic polymer having an average molecular weight of at least about 1000, mixed therein. Preferably, the liquid organometallic compound acts as a solvent for the resin composition with the organic polymer soluble therein. As such, a polymer solution is formed. The organic polymer will remain dispersed within the organometallic compound, or vice versa depending upon the relative amounts of the two components, after cure. Additionally, the organic polymer, if hydrolyzable silane groups are present, and the organometallic compound can react with each other upon cure.

Thus, in preferred embodiments the liquid organometallic compound operates as a solvent for the polymer in the resin composition, as well as being a reactant in the system. In this way, the resin compositions of the present invention do not include any organic solvents or dispersants, such as, for example, methanol, dioxane, tetrahydrofuran, 2-ethoxyethanol, or 2-methoxyethanol. Thus, prior to cure the water-curable resin compositions of the present invention contain substantially no organic solvent, i.e., they are substantially free of organic solvents.

The water-reactive organometallic compound is used in the present multicomponent resin composition in an amount of about 1-99 wt-%, preferably about 30-99 wt-%, based on the total weight of the resin composition. Similarly, the organic polymer is used in an amount of about 1-99 wt-%, preferably about 1-70 wt-%. The particular weight ratio of these two major components vary depending on factors such as resin viscosity, resin stability, set time, and physical properties required for a particular application. Preferably, the organometallic compound is present in an amount of about 35-75 wt-%, and the organic polymer is present in an amount of about 25-65 wt-%. More preferably, the organometallic compound is present in an amount of about 40-60 wt-%, and the organic polymer is present in an amount of about 40-60 wt-%, for applications such as wood, plaster, or masonry fillers, protective overcoats, sealants, caulks, and glazes. For certain advantage, the organometallic compound is present in an amount of greater than about 50 wt-%.

The multicomponent resin composition, i.e., the combination of water-reactive liquid organometallic compound and organic polymer, is flowable. That is, it is easily applied to a workpiece, fills voids and uneven surfaces, is self-leveling and remains in place during cure. Preferably, the resin composition, e.g., polymer solution, of the present invention has a viscosity of no greater than about 500,000 centipoise (cps) and at least about 100 cps, i.e., about 100- 500,000 cps. A resin composition of low viscosity, i.e., 100–10,000 cps, is desirable, for example, when the composition is to be sprayed onto a substrate. In contrast, a resin composition of high viscosity, i.e., 200,000–500,000 cps, is desirable, for example, when the composition is to be used as a putty that must be conformable yet maintain its shape as it cures. It is understood, however, that certain compositions, such as those used for putty, may have a viscosity of greater than 500,000 cps. A moderate viscosity, i.e., 5,000–15,000 cps, may be desirable if, for example, the composition is to be applied to a substrate by brush.

Control of the viscosity of the resin compositions of the present invention is important for many applications and is dependent upon factors such as polymer composition and molecular weight, as well as the relative amounts of the organometallic liquid and the organic polymer. Generally, the higher the molecular weight of the organic polymer and the higher the organic polymer to organometallic liquid ratio, the higher the composition viscosity. Also, the higher the amount of a filler, the higher the composition viscosity.

The solution viscosity is also affected by the type of groups present in the organic polymer. That is, the resin composition viscosity is affected by hydrogen bonding moieties, such as amide and urethane groups, by crystalline moieties, such as octadecyl and polyethylene oxide units, and by other molecularly associating species, such as perfluoroaliphatic domains. Moieties such as these may be attached to the organic polymer in a side-chain fashion or they may be incorporated directly into the polymer backbone.

Upon hardening, preferred resin compositions of the present invention generate little heat. This is advantageous because there is little thermal expansion, followed by cooling and shrinkage, of the composition during cure. Also, in many applications the cured compositions retain considerable strength in the presence of water and heat. Furthermore, the resin compositions are free of reactive groups such as isocyanates, aziridines, epoxides, and acrylates thereby obviating any potential concern over the presence of such groups in synthetic composite materials. Unreacted "reactive" groups such as these are undesirable in the resin compositions of the present invention because they react with biomatter by forming stable covalent linkages with nucleophilic residues present in biomatter, e.g., amine, mercaptan, and carboxylic acid residues. These reactions are generally not easily reversed. Thus, there exists the potential for long-term modification of tissue. While hydrolyzable silanes are reactive with water, they do not pose the health concerns demonstrated by polymers containing the above-listed reactive groups. Thus, the resin compositions of the present invention incorporate only "non-reactive" organic polymers, including hydrolyzable silane functional polymers. Thus, the resin compositions, particularly the polymer solutions, of the present invention are new alternatives to resin compositions containing polymers having groups reactive with biomatter.

The Organometallic Compound

Suitable organometallic compounds for use in the multicomponent resin compositions of the present invention are liquid under ambient conditions, i.e., room temperature (20°–30° C.) and atmospheric pressure (about 1 atm). They have a viscosity of preferably no greater than about 100,000 cps, more preferably no greater than about 10,000 cps, and most preferably no greater than about 1,000 cps. They also contain at least one hydrolyzable group per molecule, i.e., groups that react with water, preferably at least three hydrolyzable groups per molecule. A hydrolyzable group functionality, i.e., the number of groups per molecule, of three results in faster cure and better crosslink density of the cured product.

The hydrolyzable groups include, halogen atoms, alkoxy, carboxy, amino, amide, alkenoxy, dialkylominooxy, ketoxime, aldoxime, and similar groups. Preferably, the hydrolyzable groups are selected from the group consisting of alkoxy, alkenoxy, carboxy, amino, amide, dialkylaminooxy, ketoxime, and aldoxime. More, preferably, the hydrolyzable groups are alkoxy groups such as methoxy and ethoxy, at least because of their commercial availability, low cost, and low toxicity. Once the organometallic compounds react with water, the resultant compounds typically contain condensable metal-hydroxide groups. Thus, the hydrolyzed organometallic compounds are then capable of condensing to form higher molecular weight species, which ultimately solidify. Although condensation typically occurs, there is no requirement that this reaction step must occur to form useful composite materials.

Although not intending to be limited to any particular theory, upon hydrolysis, and often condensation, the organometallic compounds suitable for use in the present invention are thought to react either to form discrete reinforcing solid domains within an organic polymer matrix, or to form a continuous organometallic polymer matrix. The organometallic polymer matrix could surround discrete organic polymer domains or it could be intertwined with an organic polymer matrix to form an interpenetrating network. Whether organometallic solid domains or organometallic polymer matrices are formed depends on the type of organometallic compound chosen, on the amount used relative to the amount of organic polymer in the resin composition, and on any catalyst used to promote the reaction. For example, if the organometallic compound is an organoborate, upon hydrolysis it is believed that solid domains of boric acid are formed within the solidified organic polymeric matrix. If, however, the organometallic compound is an organosilicate and a sufficient amount is used, upon hydrolysis a siliconcontaining polymeric matrix is believed to be formed which may be intertwined with a solidified organic polymeric matrix.

Thus, the organometallic compound could in theory act as a reinforcing filler in the organic polymeric matrix, or it could form a polymeric matrix itself. In preferred embodiments, the organometallic compound cures to form a covalent interaction with a silane functional organic polymer. In sum, the organometallic liquid compound, preferably acting as the solvent in the resin composition, is a reactant, capable of forming a filler and/or a continuous inorganic matrix, and it can participate in crosslinking between organic polymer chains.

In general, a preferred liquid organometallic compound has the general formula (Formula I):

$$(R^1O)_x MR^2_{(y-x)}$$

wherein:
 each $R^1$ is independently a substituted or unsubstituted $C_1$–$C_{100}$ hydrocarbon group, optionally interrupted in the backbone by 1—50 nonperoxide —O—, —C(O)—, —S—, or —N— groups;

each $R^2$ is independently selected from the group consisting of hydrogen and a substituted or unsubstituted $C_1$–$C_{100}$ hydrocarbon group, optionally interrupted in the backbone by 1–50 nonperoxide —O—, —C(O)—, —S—, or —N— groups;

x is an integer between 1 and y, inclusive;

y is the valence of M; and

M is selected from the group consisting of boron, aluminum, silicon, and titanium.

Herein, when it is said that "each" $R^1$ or $R^2$ is "independently" some substituent group, it is meant that generally there is no requirement that all $R^1$ groups be the same, nor is there a requirement that all $R^2$ groups be the same. Furthermore, with respect to y, the valence of M is the number that represents the combining power of one element with another. For boron, this is 3, aluminum is 3, silicon is 4, and titanium is 4.

If the hydrocarbon groups in $R^1$ and $R^2$ are interrupted in the backbone by nonperoxide —O—, —C(O)—, —S—, or —N— groups, the interrupting group is preferably an oxygen, nitrogen, or sulfur atom. The N atoms can be primary (terminal), secondary, or tertiary, but they are preferably tertiary atoms. Furthermore, if the backbone does contain oxygen, nitrogen, or sulfur atoms, it is preferably interrupted by about 1–9 of these atoms.

In more preferred materials, x=y (most preferably x=3), and each $R^1$ is independently selected from the group consisting of a $C_1$–$C_{20}$ alkyl, a $C_3$–$C_{18}$ cycloalkyl, a $C_6$–$C_{18}$ aryl $C_2$–$C_{18}$ alkenyl, a $C_1$–$C_{18}$ acyl, and a $C_3$–$C_{18}$ ketoxime More preferably, each $R^1$ is independently selected from the group consisting of a $C_1$–$C_8$ alkyl, a $C_5$–$C_8$ cycloalkyl, a $C_6$–$C_{10}$ aryl, $C_1$–$C_8$ acyl, and a $C_3$–$C_6$ ketoxime. Most preferably, each $R^1$ is a $C_1$–$C_3$ alkyl.

In more preferred materials, each $R^2$ is independently selected from the group consisting of hydrogen, a $C_1$–$C_{20}$ alkyl, a $C_3$–$C_{18}$ cycloalkyl a $C_6$–$C_{18}$ aryl, and a $C_2$–$C_{18}$ alkenyl. More preferably, each $R^2$ is independently selected from the group consisting of hydrogen, a $C_1$–$C_{10}$ alkyl, a $C_5$–$C_8$ cycloalkyl, a $C_6$–$C_{10}$ aryl, and a $C_2$–$C_{10}$ alkenyl. Most preferably, each $R^2$ is independently selected from the group consisting of hydrogen, a $C_1$–$C_6$ alkyl, a $C_5$–$C_6$ cycloalkyl, a $C_6$ aryl, and a $C_2$ alkenyl. Of these groups, $R^2$ preferably selected from the group consisting of hydrogen, methyl, ethyl, phenyl, and vinyl.

A single organometallic compound according to Formula I can be used in the resin composition of the present invention. Alternatively, a mixture of several different materials according to Formula I can be used in the resin composition. Furthermore, dimeric, trimeric, and tetrameric compounds, etc., of compounds of Formula I are useful in the resin compositions of the present invention. The liquid products of partial hydrolysis of the organometallic compounds of Formula I, for example polydiethoxysiloxane, can also be utilized.

In general, upon exposure to water the organometallic compounds will hydrolyze relatively rapidly. The resulting hydrolyzed materials (for example silanols in the case of M being Si) can react with other hydrolyzed molecules (and in some instances with molecules of nonhydrolyzed material) to form extended M-0-M systems (for example, silica particles), although this does not always occur. Such a reaction is sometimes referred to as a "condensation," because it concerns the expulsion of water or similar molecules (for example, simple alcohols). As used herein the term "condensation" is not meant to suggest any particular path of hydrolysis and follow-up reaction.

A variety of organometallic liquids according to Formula I are commercially available. These include, but are not limited to, trimethyl borate, triethyl borate, triisopropyl borate, tri-n-butyl borate, aluminum tri-sec-butoxide, diethylaluminum ethoxide, tetramethoxysilane, tetraethoxysilane, tetra-i-propoxysilane, tetraacetoxysilane, tetraphenoxysilane, tetra(2-(2-methoxyethoxy) ethoxy)silane, tetraacetoxysilane, triethoxysilane, ethyltriethoxysilane, vinyltriethoxysilane, dimethyldiethoxysilane, trimethylsilylphenoxide, diphenyldimethoxysilane, isopropenoxytrimethylsilane, methyl tri-(butene oxime) silane, titanium (IV) isopropoxide, titanium (IV) propoxide, and titanium (IV) 2-ethylhexoxide. The liquid products of partial hydrolysis of organometallic compounds, for example polydiethoxysilane, may be utilized as well.

Preferred organometallic liquids suitable for use in the resin compositions of the present invention include the silanes, borates, and titanates having 1-4 $C_1$–$C_3$ alkoxy groups ($OR^1$ groups). These include trimethyl borate, triethyl borate, triisopropyl borate, tetramethoxysilane, tetraethoxysilane, tetra-i-propoxysilane, triethoxysilane, vinyltriethoxysilane, and titanium (IV) isopropoxide. These are preferred at least because of availability and rate at which they undergo hydrolysis.

A more preferred group of organometallic liquids include silane compounds having 1-4 methoxy, ethoxy, or propoxy groups. These include tetramethoxysilane, tetraethoxysilane, tetra-i-propoxysilane, triethoxysilane, and vinyltriethoxysilaneo The most preferred organometallic liquid is tetraethoxysilane (TEOS). TEOS has a relatively low toxicity (oral-rat LD50=6270 mg/kg), high boiling point (169° C.), and high flash point (46° C.). It has a relatively innocuous hydrolysis product (ethanol), and has a high yet controllable rate of hydrolysis. For example, it solidifies within minutes upon contact with water in the presence of a catalyst. TEOS is also readily available from numerous sources, e.g., Akzo Chemicals (Chicago, IL), at a relatively low cost.

The Organic Polymer

The organic polymers of the present invention provide certain preferred characteristics in the cured composition relating to toughness, strength, and good physical integrity. They are thermoplastic polymers with number average molecular weights of at least about 1,000. The preferred polymer molecular weight will vary depending upon the desired resin viscosity. Lower molecular weights will generally produce lower resin viscosities while higher molecular weights lead to higher viscosities.

Suitable organic polymers are dispersible with, and preferably soluble in, the organometallic liquids described above. As used herein, a stably dispersible organic polymer refers to one that will form a stable colloidal dispersion with an organometallic liquid for at least about two years under moisture-free, ambient conditions. As indicated above, preferred curable resin compositions according to the present invention include an appropriate organic polymer material dissolved within the liquid organometallic compound such that polymer solutions, i.e., microscopic dispersions, are formed. Preferably, the organic polymers are soluble in the organometallic compounds in an amount of at least about 30% by weight.

The organic polymer is nonreactive. As used herein a "nonreactive" organic polymer refers to one that does not contain groups irreversibly reactive with biomatter, thus silane groups may be present. A silane-free nonreactive organic polymer used in the resin compositions does not react with itself, with water, or with the organometallic liquid during cure, but rather it remains mixed with, or suspended in, the water-reactive organometallic domain or matrix after cure. For example, a resin composition containing polystyrene and TEOS cures upon the hydrolysis and condensation of TEOS. However, the polystyrene does not chemically react. Generally, silane-free nonreactive polymers are those having a number average molecular weight of at least about 10,000, preferably at least about 20,000.

By the term "reactive" in this context, it is meant that with such groups, the organic polymer material would be capable of reacting with biomatter by forming stable covalent linkages with nucleophiles present in the biomatter, e.g. amine, mercaptan and carboxylic acid residues. These reactions generally are not easily reversible and therefore have the potential of producing long term modification of tissue. Examples of such reactive groups include epoxy, acrylate, isocyanate, and aziridine groups. However, hydrolyzable silanes are distinguished from those groups in that the reaction product of a hydrolyzable silane with almost all organic nucleophiles is hydrolytically unstable. It is expected that any of these unstable products would have covalent bonds which would be easily cleaved thus allowing the organism to excrete the organosilane. Thus, as defined herein, nonreactive organic polymers include those carbon-based polymers with -SiOR groups.

The organic polymers are thermoplastic organic polymers. They can be either addition polymers, i.e., polymers with a backbone containing only carbon atoms or condensation polymers, i.e., polymers with a carbon backbone interrupted with ethers, carbamates, etc. Preferably, the polymers are addition polymers. This is generally because they are easier to prepare in situ, i.e., directly in the organometallic liquid than can the condensation polymers. Furthermore, because they are easier to make, they can be tailor made with specific properties. Thus, a greater number of addition polymers not commercially available can be used in the resin compositions of the present invention.

Particularly useful addition polymers are those made from ethylenically unsaturated monomers. These monomers do not contain any other reactive substituents, such as isocyanate, epoxy or aziridine groups. Commercially available monomers, from which such addition polymers can be formed, include but are not limited to, ethylene, isobutylene, 1-hexene, chlorotrifluoroethylene, vinylidene chloride, butadiene, isoprene, styrene, vinyl naphthalene, ethyl acrylate, 2-ethylhexyl acrylate, tetrahydrofurfuryl acrylate, benzyl acrylate, poly(ethylene oxide) monoacrylate, heptafluorobutyl acrylate, acrylic acid, methyl methacrylate, 2-dimethylaminoethyl methacrylate, 3-methacryloxypropyltris(trimethylsiloxy)silane, isobutyl methacrylate, itaconic acid, vinyl acetate, vinyl stearate, dimethylacrylamide, tert-butyl acrylamide, acrylonitrile, isobutyl vinyl ether, and vinyl pyrrolidinone.

Another group of particularly useful addition polymers are those made from hydrolyzable, i.e., waterreactive, alkoxy silane functional monomers. Commercially available alkoxy silane functional monomers include, but are not limited to, vinyltriethoxysilane, vinyltris(2-methoxyethoxy)silane, and 3-methacryloxypropyltrimethoxysilane. Polymers bearing hydrolyzable silane functionality are preferred because the pendant hydrolyzable silane moiety (-SiOR) can provide a site for covalent coupling of the organic and inorganic phases. Useful organic polymers containing hydrolyzable silane groups are those described in U.S. Pat. Nos. 4,411,262 and 4,510,622 (von Bonin et al.). These can be used to advantage in combination with the liquid organometallic compound described above. In certain situations, it is desirable to avoid the use of polymers containing pendant hydrolyzable silane groups, i.e., alkoxy silane polymers.

A preferred group of monomers useful in the preparation of the addition polymers of the resin compositions include butadiene, styrene, alkyl methacrylates of 4 to 12 carbon atoms, vinyltriethoxysilane, 3-(trimethoxysilyl)propyl methacrylate, and mixtures thereof. A more preferred group of monomers useful in the preparation of the addition polymers of the resin compositions include, is 3-(trimethoxysilyl)propyl methacrylate, isobutyl methacrylate, vinyltriethyoxysilane, and mixtures thereof.

Also as indicated above, condensation polymers are useful as the organic polymer in resin compositions according to the present invention. In general, useful condensation polymers are those possessing, for example, backbone ester, carbonate, amide, carbamate, urea, ether, and sulfone linkages. Preferably, the condensation polymers do not include polyethers and other ether-containing organic polymers. At least in part this is because compositions incorporating such condensation polymers are not generally weather resistant. That is, they may yellow, for example. Thus, the resin compositions of the present invention that include condensation polymers preferably include nonether-containing condensation polymers.

Condensation polymers possessing more than one functional group, for example, poly(ester-amide)s, are also useful. Polyesters, for example, poly(neopentyl glycol sebacate) and poly(caprolactone), are preferred condensation polymers because of their good solubility and because they are relatively inexpensive. Useful condensation polymers include those bearing hydrolyzable silane functionality. These can be prepared, for example, from reaction of an alcohol-, mercaptan- or amine-functional condensation polymer with, for example, 3-isocyanatopropyltriethoxysilane. In certain situations, however, it may not be desirable to use a condensation polymer that includes silicon-containing functional groups.

In the organic polymer component, nonreactive substituents that can be affixed to the polymer backbone include hydrogen, fluorine, and chlorine atoms, as well as alkyl, alkenyl, aryl, carboalkoxy, carbamide, alkoxy, carboxyl, nitrile, pyrrolidinone, and carboxylic acid groups. Additionally, pendant hydrolyzable silane functionality may be present. Organic polymers bearing highly reactive substituents, such as, acrylate, methacrylate, epoxy, aziridine, or isocyanate are not desirable substituents because of health concerns.

The term "organic polymer" (as used herein with respect to the polymer component of molecular weight at least about 1,000) is meant to include within its scope copolymers, that is, polymers derived from several different monomers reacted in random or block order.

This includes, for example, poly(styrene-co-butadiene) and poly(acrylonitrile-co-butadiene-co-styrene). The term "organic polymer" in this context is further meant to include within its scope polymer blends formed from the combination of two or more dissimilar polymers, for example, an intimate mixture of poly(styrene) and poly(styrene-co-butadiene).

The choice of monomer or comonomers used to prepare either the addition or condensation polymers will affect the physical properties of the final cured product. In general, if a soft product is desired, monomers that contribute to a low glass transition temperature (Tg), e g , −60° C. to 20° C. should be incorporated into the polymer. If, however, a harder product is desired, monomers that contribute to a higher Tg, e g , 20° C. to 120° C. should be incorporated into the polymer.

As stated above, the organic polymer used in the resin compositions of the present invention have a number average molecular weight of at least about 1000. Procedures for controlling the molecular weights of polymers during their preparation are known. The molecular weights of condensation polymers can be controlled, for example, by varying the stoichiometry of the monomers chosen or by inclusion of monovalent or polyvalent monomers. Molecular weights of addition polymers can be controlled by factors such as monomer identity and concentration, solvent identity, initiator and chain transfer agent identity and concentration, and polymerization temperature.

It is to be understood that the resin compositions of the present invention can include a combination of polymers with reactive groups that could be cured by UV, heat, or water. Such dissimilar polymers could be cured simultaneously or in a staged manner in which there could be an initial cure step followed by a subsequent cure step.

Preparation of the Resin Composition

The resin compositions of the present invention can be prepared by various methods. This can include: (a) dissolving or dispersing a preformed polymer directly in an organometallic liquid; (b) adding an organometallic liquid to an existing solution of a polymer in an organic solvent and subsequently removing the organic solvent; and (c) synthesizing a polymer in the organometallic liquid itself.

In many instances, it will be useful to directly synthesize the organic polymer within the organometallic liquid. This will be preferred, for example, when the desired organic polymer is not commercially available or when the desired organic polymer (if preformed) is difficult to dissolve within the organometallic liquid. The methods of direct synthesis of the organic polymer are analogous to the methods used in polymer formation in the absence of the organometallic compound. These methods are known to one of skill in the art.

The method of direct synthesis of the organic polymer (i.e., synthesis within the organometallic liquid) is particularly attractive when the organic polymer is an addition polymer. Addition polymerization may be conducted using standard free radical, cationic, anionic or group transfer polymerization techniques. Useful monomers include, but are not limited to, acrylates, methacrylates, acrylamides, vinyl esters, vinyl aromatics, vinyl ethers, and vinyl heterocycles. Specific examples of useful monomers include ethyl acrylate, isobutyl methacrylate, N,N-dimethylacrylamide, vinyl acetate, styrene, isobutyl vinyl ether, and vinyl carbazole.

The polymerization may be initiated thermally, photochemically or by other means known in the art. Useful polymerization initiators include, but are not limited to, azo- and peroxide-functional compounds, substituted acetophenones and benzophenones, and iodonium salts. Specific examples of useful initiators include azobis(isobutyronitrile),tert-butylperoxybenzoate, OO-tert-butyl-O-(2-ethylhexyl)monoperoxycarbonate, benzoin ethyl ether, 2,2-dimethoxy-2-phenylacetophenone, 4,4-bis(dimethylamino)benzophenoneanddiphenyliodoniumchloride. The monomers and initiators in this method can independently be added continuously or in a batchwise mode to the organometallic liquid. A typical temperature range for synthesis of a polymer from at least one type of monomer dissolved in an organometallic compound is about 70°–140° C.

Direct formation of a resin composition in an organometallic liquid can be performed by contacting about 1–70 wt-% polymer with about 30–99 wt-% organometallic liquid. Preferably, about 35–75 wt-% organometallic liquid is combined with about 25–65 wt-% organic polymer, and more preferably, about 40–60 wt-% organometallic compound is combined with about 40–60 wt-% organic polymer. These weight percentages are based on the total weight of the resin composition. The mixture can be optionally agitated and/or temporarily warmed to facilitate solution formation. Mechanical stirring of the mixture is preferred and heating of the mixture at temperatures up to and including the boiling point of the organometallic liquid is preferred, with subsequent cooling of the formed solution to ambient temperature. Solution formation at temperatures above the boiling point of the liquid, attainable for example in a sealed reactor, can also be useful. Generally, and preferably, the mixture of organic polymer and liquid organometallic compound is heated at a temperature of about 80–160° C.

Solution formation by way of solvent exchange is useful and is preferred when working with polymers which are difficult to dissolve in organometallic liquids. This method involves the steps of synthesizing an organic polymer or dissolving a preformed organic polymer in an organic solvent, preferably a common organic solvent possessing a boiling point lower than that of the organometallic liquid to be used as the ultimate polymer solvent. Examples of such organic solvents include methyl ethyl ketone, toluene, 1,2-dichloroethane, tetrahydrofuran, and ethyl acetate. The resin composition is then diluted with the desired organometallic liquid. The organic solvent is then removed, preferably by temporarily warming the resin compositions and allowing the organic solvent to distill. More preferably, the organic solvent is removed by conducting the solvent distillation at a reduced pressure. Most preferably, the reaction mixture is heated at a temperature of about 80–120° C. and the solvent is removed under vacuum.

The preferred resin compositions are fluids having viscosities of about 100–500,000 cps at room temperature (20–30° C.). This can be achieved by controlling the molecular weight of the polymer and/or by adjusting the solids content of the resin composition.

Adjuvants

Preferred compositions according to the present invention can include a variety of adjuvants therein. It is foreseen that adjuvants such as: surfactants, catalysts, toughening agents, fillers, and/or pigments (or dyes), will most typically be used.

Surfactants

The curable resin compositions optionally include a surfactant. The incorporation of a surfactant is desirable in preferred situations, for example when the polymer solution itself is hydrophobic. The presence of a surfactant improves the flow of the resin composition, allows the water to be mixed more uniformly throughout the system, and provides improved leveling. It also can aid the resin in the wetting of fillers and/or substrate. Surfactants useful in the practice of the present invention include anionic, cationic, and nonionic surfactants. Preferred surfactants are commercially available nonionic surfactants. These include, but are not limited to, polyethylene oxide, polyethylene oxide 4-nonylphenyl monoether, and propylene oxide-ethylene oxide block copolymers. Generally, if surfactant is used at all, what is required is that an amount of the surfactant(s) be used which is necessary to achieve the desired effect. Typically, the surfactants will be used at levels of 0.1-1.0% by weight and preferably 0.2-0.5% by weight.

Catalysts

The resins useful in the present invention can be cured in the presence of a catalyst to increase the rate of hydrolysis and condensation of the organometallic liquid and polymerization of the organic polymeric network. Either acidic or basic catalysts may be useful. Preferred catalysts are acid catalysts, whether an organic or an inorganic acid catalyst. Of the acid catalysts, the preferred ones are those having a pKa of less than about 3.0. The most preferred acid catalysts are those that lower the pH of the resin composition to below 3.

Acid catalysts include, but are not limited to, alkylsulfonic acids such as ethanesulfonic acid, arylsulfonic acids such as benzenesulfonic acid, poly(perfluoroalkylsulfonyl)alkanes such as bis(trifluoromethylsulfonyl)methane, polyhaloalkanesulfonic acids such as trifluoromethanesulfonic acid, aliphatic carboxylic acids such as trifluoroacetic acid and acetic acid, phosphate esters such as diethylphosphate, and strong inorganic acids such as hydrochloric acid, sulfuric acid, and nitric acid. A preferred acid catalyst is selected from the group consisting of an alkanesulfonic acid, a perfluorocarboxylic acid, a bis(perfluoroalkylsulfonyl)methane, a dialkyl phosphate, and mixtures thereof. A more preferred acid catalyst is selected from the group consisting of ethanesulfonic acid, trifluoroacetic acid, bis(trifluoromethylsulfonyl)methane, dibutyl phosphate, and diethylphosphate. A preferred acid catalyst imparts a short cure time to the resin composition at room temperature.

Compounds that generate useful acids on contact with water may also be useful catalysts and include, but are not limited to, boron trifluoride etherate, acetyl chloride, p-toluenesulfonyl chloride, trifluoroacetic anhydride, thionyl chloride, and tetrachlorosilane.

Base catalysts useful in the practice of the present invention include, but are not limited to, dimorpholino diethyl ether, 1,1,3,3-tetramethylguanidine, 1,8-diazabicyclo[5.4.0]undec-7-ene, 1,4-diazabicyclo[2.2.2]octane, 4-dimethylaminopyridine, triethylamine, dibutyltin oxide, calcium hydroxide, dibutyltin diacetate, and ammonium carbonate.

A strong acid catalyst or a strong base catalyst is preferred when a fast cure is desired. A relatively weak acid catalyst or base catalyst is preferred to promote slow cures. In general, if a catalyst is used at all, all that is required is sufficient catalyst to achieve the desired effect. In general, at least about 0.5 wt-%, preferably about 1.5-3.0 wt-%, is used in the resin compositions of the present invention.

Toughening Agents

Toughening agents may also be included in the curable resin compositions of the present invention to increase the strength of the cured material. Such agents can comprise carboxy, amine, methacrylate, and vinyl terminated butadiene-acrylonitrile polymers (available from BF Goodrich, Cleveland, OH). Thermoplastics such as styrene-butadiene copolymers (Kraton, Shell Chemical Co., Houston, TX), polyurethanes, and polytetrafluoroethylene can also be useful as toughening agents. In addition, core/shell polymers such as those comprising a rubbery phase and thermoplastic phase such as graft polymers having a polymerized diene rubbery core such as a styrene-butadiene block copolymer core and a poly(meth)acrylate shell available for example as BTA IIIF from Rohm & Haas (Philadelphia, PA) may be useful as toughening agents in the curable resins of the present invention. Furthermore, plasticizers such as dioctyl phthalate and butyl benzyl phthalate may be used to reduce brittleness and thereby toughen the cured material. Generally, if a toughening agent is used at all, what is required is that an amount of the agent be used to achieve the desired effect. Typically, up to about 50 wt-%, preferably up to about 10 wt-%, is used in the resin compositions of the present invention.

Fillers

Fillers may also be used in the curable resin compositions to increase strength of the composite obtained, reduce cost, and modify appearance and handling characteristics. Useful fillers include, but are not limited to, aluminum oxides, calcium metasilicate, titanium dioxide, fumed silica, amorphous silica, ground glass, glass fibers, glass bubbles, glass microspheres or mixtures of these materials. Additional fillers may include particles of polypropylene, polyethylene, or polytetrafluoroethylene. In general, if a filler is used at all, what is required is that enough filler be used to achieve the desired effect. Typically, up to about 50 wt-%, preferably about 5-20 wt-%, and more preferably about 5-15 wt-%, is used in the resin compositions of the present invention. Calcium metasilicate fillers are particularly preferred in the case of rigid orthopedic casting tape materials and are discussed in commonly assigned, copending U.S. application filed on even date herewith, incorporated herein by reference.

Colorants

The color of the curable resin composition of the present invention may be effected by colorants, such as inorganic pigments, organic pigments, and dyes. Suitable colorants include those disclosed in U.S. Pat. Nos. 5,005,566 and 5,052,380. Hydroxyfunctional colorants may be chemically bound into the curable resin composition by condensation with —SiOH groups on the polymer or by first being functionalized with a vinyl group through reaction with isocyanatoethyl methacrylate or vinyldimethylazlactone, and then being copolymerized with the above-described monomers in the preparation of the resin of the present invention. In general, if pigments or dyes are used at all, what is required is a sufficient amount of the pigments or dyes to achieve the desired effect. Typically, up to about 5 wt-% can be used in the resin compositions of the present invention.

A typical pigment used is $TiO_2$ to impart a white color to the composite material. This component can also be used as a filler. Thus, for materials that can be used as both pigment and filler, such as $TiO_2$, up to about 15 wt-% can be used.

PREFERRED EMBODIMENTS

| Generic Composition | |
|---|---|
| Resin Composition | |
| Copolymer of: | 25–65% |
| ($C_4$–$C_8$) alkyl methacrylate | 60–100% |
| Alkoxysilylalkyl methacrylate | 0–40% |
| Organometallic Compound | 35–75% |
| Water Cure Catalyst | 1.5–3.0% |
| Surfactant | 0.2–0.5% |

All percentages, and "parts" used herein are based on the total weight of the resin composition, unless otherwise stated.

APPLICATIONS

The resin compositions disclosed herein are useful as pliable materials capable of filling voids and subsequently reacting with moisture to produce a nonflowing rigid, semirigid, or flexible composite. Thus, these materials may be formulated, for example in moisture curable elastomeric sealants or nonelastomeric caulks or highly filled putties and glazes. They can also be used as adhesives, coatings, water-proofing agents, templating agents, and the like. A particular advantage of the resin compositions of the present invention is that upon cure they possess sufficient surface tension such that they can be coated, as for example with paint.

The invention has been described with reference to various specific and preferred embodiments and will be further described by reference to the following detailed examples. It is understood, however, that there are many extensions, variations, and modifications on the basic theme of the present invention beyond that shown in the examples and detailed description, which are within the spirit and scope of the present invention. Except where noted, all chemicals used are available from Aldrich Chemical Company, Milwaukee, WI.

EXAMPLES

EXAMPLE 1

This example demonstrates the direct formation of a polymer solution in an organometallic liquid and its subsequent hydrolytic cure.

Solution Preparation: A mixture of poly (α-methylstyrene) with an average molecular weight 80,800 (10.0 grams) and tetraethoxysilane (TEOS) (10.0 grams) was heated to 160° C. The polymer was dissolved within ten minutes forming a clear, colorless, viscous solution. The polymer solution was allowed to cool to 22° C.

Hydrolytic Cure: A portion of the polymer solution (6.0 grams) was mixed with acetyl chloride catalyst (0.03 grams) and Igepal® CO-720 surfactant (0.03 grams). Water (1 gram) was added and well mixed into the polymer solution. A mild exotherm ensued and the sample became a hard white mass within three minutes.

EXAMPLE 2

This example demonstrates direct formation of a polymer solution wherein the polymer is a condensation polymer.

A mixture containing poly(neopentyl glycol sebacate) (10.0 grams) and TEOS (10.0 grams) was warmed to 160° C. A solution was formed within ten minutes and remained clear and colorless when allowed to cool to 22° C.

EXAMPLE 3

This example demonstrates solution preparation by solvent exchange. This example further demonstrates utilization of a polymer derived from two different monomers, that is, a copolymer.

Styrene/butadiene ABA block copolymer (28% styrene) (75.0 grams) was dissolved in 2-butanone (300.0 grams, 20% solids). TEOS (75 grams) and Igepal® CO-720 surfactant (1.20 grams) were added to the solution. The solution was heated to 100° C. and the butanone was removed under aspirator vacuum. When the distillate flow ceased, the vacuum was released, benzoyl chloride (2.80 grams) was added, and the solution was allowed to cool. A viscous, homogeneous solution resulted.

EXAMPLE 4

This example demonstrates the formation of a polymer solution by solvent exchange wherein the polymeric component is a blend of two dissimilar polymers.

Poly(styrene) with an average molecular weight of 280,000 (60.0 grams) and styrene/butadiene ABA block copolymer (28% styrene) (15.0 grams) were added to 2-butanone (175.0 grams) and the mixture was heated and allowed to reflux for 2½ hours to provide a homogeneous solution. TEOS (75.0 grams), Igepal® CO-720 surfactant (6.0 grams), and diphenyldichlorosilane catalyst (2.50 grams) were added and mixed into the solution. The butanone was removed under aspirator vacuum and the polymer solution was subsequently cooled to 22° C. An aliquot of the resulting turbid, homogeneous, viscous solution, when treated with water, formed a hard white mass within two minutes.

EXAMPLE 5

This example demonstrates the synthesis of a polymer in an organometallic solvent to form a polymer solution.

A nitrogen purged solution containing isobutyl methacrylate (199.5 grams), 3-(trimethoxysilyl)propyl methacrylate (10.5 grams), and tert-butyl peroxybenzoate (6.90 grams) was added dropwise over a 2.3 hour period to nitrogen purged TEOS (90.0 grams) at 140° C. with stirring. The clear, colorless solution was held at 140° C. for one additional hour and then was cooled to 120° C. A second charge of peroxide (0.6 grams) was added and the solution was stirred and held at 120° C. for one hour and then allowed to cool to room temperature. The weight average molecular weight as measured by gel permeation chromatography was found to be 12,900 and the viscosity as measured on a Brookfield viscometer was 348,000 centipoise.

EXAMPLES 6–12

The polymer solutions of Examples 6–12 were prepared in TEOS following the general procedure of Example 5.

| Example | Polymer Compositions (monomer weight ratio) | Weight % Polymer | Molecular Weight | Viscosity (centipoise) |
| --- | --- | --- | --- | --- |
| 6 | 90:10 nBMA:A174 | 70 | 13,300 | 10,600 |
| 7 | 90:10 iBMA:A174 | 70 | 12,500 | 47,400 |
| 8 | 70:30 iBMA:A174 | 70 | 19,600 | 39,000 |
| 9 | 60:40 iBMA:A174 | 70 | 15,800 | — |
| 10 | 90:10 tBMA:A174 | 60 | 8,540 | 33,600 |
| 11 | 90:10 CyMA:A174 | 55 | 15,900 | 27,600 |
| 12 | 70:30 iBMA:A151 | 70 | 8,810 | — |

In these compositions, nBMA is n-butyl methacrylate, iBMA is iso-butyl methacrylate, tBMA is tert-butyl methacrylate, CyMA is cyclohexyl methacrylate (available from American Tokyo Kasei, Portland, OR), A174 is 3-methacryloxypropyltrimethoxysilane, and A151 is vinyltriethoxysilane (both available from Union Carbide, Danbury, CT). Molecular weights were measured by gel permeation chromatography and viscosities were measured on a Brookfield viscometer.

EXAMPLES 13–17

The polymer solutions of Examples 13–17 were prepared in various organometallic liquids following the general procedure of Example 5. These examples demonstrate that a wide range of organometallic liquids are useful as polymer solvents. Example 15 further demonstrates the use of two dissimilar organometallic liquids together as the polymer solvent. In all cases, a 70:30 iBMA:A174 monomer weight ratio was charged at 70% solids in the solvent stated.

| Example | Solvent |
| --- | --- |
| 13 | (iPrO)$_3$B |
| 14 | (iPrO)$_4$Ti |
| 15 | TEOS:(iPrO)$_4$Ti 15:3 |
| 16 | polydiethoxysilane |
| 17 | (sec-BuO)$_3$Al |

In these compositions, (iPRO)$_3$B is triisopropyl borate, (iPrO)$_4$Ti is titanium (IV) isopropoxide, and (sec-BuO)$_3$Al is aluminum tri-sec-butoxide.

EXAMPLE 18

This example demonstrates the utility of a water-curable solution containing an organic polymer dissolved in an organometallic liquid as an initially carvable, ultimately sandable wood patching material.

A V-shaped groove was machined into a pine board using a ½ inch (1.27 cm) V-groove chamfering router bit. The groove was ½ inch (1.27 cm) wide at the board surface, ¼ inch (0.64 cm) deep and 6 inches (15.24 cm) long.

The copolymer solution prepared in Example 8 (20.0 grams) was thoroughly mixed with Igepal® CO-720 surfactant (0.30 grams) and acetyl chloride catalyst (0.20 grams) to provide a clear, homogeneous solution. Water (3.5 grams) was added. Upon mixing, the polymer solution became opaque and white and the solution viscosity increased.

The polymer solution was poured into the groove in the board and overflowed onto the surrounding board surface such that the crowned surface of the polymer solution stood approximately 1/8 inch (0.32 cm) above the board surface. Within two minutes the polymer solution was nonflowing and within five minutes had become leathery. The polymeric mass was found to be easily trimmed by use of a sharp knife so that the surface of the polymeric composite was flush with the board surface. After fifty minutes the polymeric material remained leathery but was found to be sandable as well using 60 grit sandpaper. The cured composite accepted a coat of latex-based paint nicely.

All patents, patent documents, and publications cited herein are incorporated by reference. The foregoing detailed description and examples have been given for clarity of understanding only. No unnecessary limitations are to be understood therefrom. The invention is not limited to the exact details shown and described, for variations obvious to one skilled in the art will be included within the invention defined by the claims.

What is claimed is:

1. A water-curable polymer solution comprising:
   (a) about 30–99 wt-% of a water-reactive liquid organometallic compound having at least three hydrolyzable groups per molecule; and
   (b) about 1–70 wt-% of a nonreactive organic thermoplastic polymer, having a number average molecular weight of at least about 1,000, dissolved within the water-reactive liquid organometallic compound;
   wherein the polymer solution is stable at a temperature of about 0°–100° C. and is capable of curing upon exposure to water to form a composite material at a temperature of about 10°–100° C.

2. The water-curable polymer solution of claim 1 wherein the polymer solution is capable of curing at a temperature of about 10°–80° C.

3. The water-curable polymer solution of claim 1 wherein the polymer solution is capable of curing at a temperature of about 20°–30° C.

4. The water-curable polymer solution of claim 1 wherein the polymer solution contains substantially no organic solvent.

5. The water-curable polymer solution of claim 1 wherein the hydrolyzable groups are selected from the group consisting of halogen, alkoxy, alkenoxy, carboxy, amino, amide, dialkylaminooxy, ketoxime, and aldoxime.

6. The water-curable polymer solution of claim 1 wherein the nonreactive organic thermoplastic polymer is an alkoxy silane-functional polymer.

7. The water-curable polymer solution of claim 1 wherein the nonreactive organic thermoplastic polymer is a nonethercontaining condensation polymer.

8. The water-curable polymer solution of claim 7 wherein the condensation polymer is coupled to a hydrolyzable silane group through a urethane bond.

9. The water-curable polymer solution of claim 1 wherein the nonreactive organic thermoplastic polymer is an addition polymer.

10. The water-curable polymer solution of claim 9 wherein the addition polymer is a copolymer prepared from a (meth)acryloyloxyalkyl or vinyl functional hydrolyzable silane.

11. The water-curable polymer solution of claim 1 wherein the water-reactive liquid organometallic compound has a viscosity of no greater than about 1,000 centipoise.

12. The water-curable polymer solution of claim 1 further comprising a second water-reactive liquid organometallic compound having at least three hydrolyzable groups.

13. The water-curable polymer solution of claim 1 further comprising a second dissimilar nonreactive organic thermoplastic polymer.

14. The water-curable polymer solution of claim 1 wherein the nonreactive organic thermoplastic polymer is a copolymer.

15. The water-curable polymer solution of claim 1 wherein the polymer solution has a viscosity of about 100–500,000 centipoise.

16. The water-curable polymer solution of claim 1 further comprising an effective amount of a catalyst.

17. The water-curable polymer solution of claim 16 wherein the acid catalyst is selected from the group consisting of an alkane sulfonic acid, a perfluorocarboxylic acid, a bis(perfluoroalkylsulfonyl)methane, a dialkyl phosphate, and mixtures thereof.

18. The water-curable polymer solution of claim 1 wherein the polymer solution is capable of curing upon exposure to water without the generation of substantial heat.

19. A water-curable polymer solution comprising:
   (a) about 40–60 wt-% of a water-reactive liquid organometallic compound having the formula $(R^1O)_xMR^2_{(y-x)}$ wherein:
      (i) each $R^1$ is independently a substituted or unsubstituted $C_1$–$C_{100}$ hydrocarbon group, optionally interrupted in the backbone by 1—10 nonperoxide —O—, —S—, —C(O)—, or —N— groups;
      (ii) each $R^2$ is independently selected from the group consisting of hydrogen and a substituted or unsubstituted $C_1$–$C_{100}$ hydrocarbon group, optionally interrupted in the backbone by 1—10 nonperoxide —O—, —S—, —C(O)—, or —N— groups;
      (iii) x is an integer between 1 and y, inclusive;
      (iv) y is the valence of M;
      (v) M is selected from the group consisting of boron, aluminum, silicon, and titanium; and
   (b) about 40–60 wt-% of a nonreactive organic thermoplastic nonether-containing condensation polymer, having a number average molecular weight of at least about 1,000, dissolved within the water-reactive liquid organometallic compound;
   wherein the polymer solution is stable at a temperature of about 0°–100° C. and is capable of curing upon exposure to water to form a composite material at a temperature of about 10°–100° C.

20. The water-curable polymer solution of claim 19 comprising greater than about 50 wt-% of the liquid organometallic compound.

21. The water-curable polymer solution of claim 19 wherein $R^1$ is selected from the group consisting of $C_1$–$C_8$ alkyl, a $C_5$–$C_8$ cycloalkyl, a $C_6$–$C_{10}$ aryl, $C_1$–$C_8$ acyl, and a $C_3$–$C_6$ ketoxime.

22. The water-curable polymer solution of claim 21 wherein $R^2$ is selected from the group consisting of hydrogen, methyl, ethyl, phenyl, and vinyl.

23. The water-curable polymer solution of claim 19 further comprising an effective amount of a catalyst.

24. The water-curable polymer solution of claim 19 further comprising a toughening agent.

25. A water-curable resin composition comprising:
   (a) a water-reactive liquid organometallic compound having at least one hydrolyzable group per molecule; and
   (b) a nonreactive organic thermoplastic addition polymer, having a number average molecular weight of at least about 1,000, mixed with the water-reactive liquid organometallic compound;
   wherein the resin composition is stable at a temperature of about 0°–100° C. and is capable of curing upon exposure to water to form a composite material at a temperature of about 10°–100° C.

* * * * *

UNITED STATES PATENT AND TRADEMARK OFFICE
CERTIFICATE OF CORRECTION

PATENT NO. : 5,346,939
DATED : September 13, 1994
INVENTOR(S) : Dean M. Moren and Dean A. Ersfeld It is certified that error appears in the above-indentified patent and that said Letters Patent is hereby corrected as shown below:

Col. 3, line 66, insert a period after "ditions".

Col. 9, line 33, insert a period after "ketoxime".

Col. 13, lines 12 and 13, "e g" should read -- e. g. --.

Col. 13, line 15, "e g" should read -- e. g. --.

Col. 14, line 9, "4,4-" should read -- 4,4'- --.

Col. 14, line 10 should read -- bis(dimethylamino)benzophenone and diphenyliodonium chloride --

Col. 15, line 37 should read -- sulfonyl)alkane such as bis(trifluoromethylsulfonyl)me- --

Col. 16, line 51, after "application" insert -- Docket No. 49125USA3A --.

Signed and Sealed this

Twenty-third Day of January, 1996

BRUCE LEHMAN

Attest:

Attesting Officer

Commissioner of Patents and Trademarks